(No Model.) 7 Sheets—Sheet 2.

W. HEWITT.
MACHINE FOR MAKING WIRE ROPE.

No. 390,968. Patented Oct. 9, 1888.

Fig. 2. Sectional plan on 1-2 of Fig. 1, and on 19-20 of Fig. 14.

Fig. 3. Sectional plan on 3-4 of Fig. 1, and 11-12 of Fig. 4.

WITNESSES:
P. F. Eagle
F. Norman Dixon

INVENTOR:
Wm Hewitt
By his Attorneys
Wm E. Strawbridge
J. Bonsall Taylor

(No Model.) 7 Sheets—Sheet 5.

W. HEWITT.
MACHINE FOR MAKING WIRE ROPE.

No. 390,968. Patented Oct. 9, 1888.

Fragmentary Sectional Elevation on 21-22 of Fig 3 and on 23-24 of Fig 7.

WITNESSES:
P. F. Chagle
F. Norman Dixon

INVENTOR:
Wm Hewitt
By his Attorneys Wm C. Strawbridge
Bonsall Taylor

UNITED STATES PATENT OFFICE.

WILLIAM HEWITT, OF TRENTON, NEW JERSEY, ASSIGNOR TO THE TRENTON IRON COMPANY, OF SAME PLACE.

MACHINE FOR MAKING WIRE ROPE.

SPECIFICATION forming part of Letters Patent No. 390,968, dated October 9, 1888.

Application filed July 5, 1888. Serial No. 279,000. (No model.)

*To all whom it may concern:*

Be it known that I, WILLIAM HEWITT, a citizen of the United States, residing at Trenton, Mercer county, New Jersey, have invented certain Improvements in Machines for Making Wire Rope, of which the following is a specification.

My invention relates to a class of devices employed for making continuous ropes or cables of any desired length, a machine of my invention being capable in a single continuous operation of laying or twisting a number of wires around a strand core to form a strand, and of laying or twisting a number of strands, similarly and as above formed, around a main core to form a completed rope or cable. The machine is moreover equally applicable for the manufacture of continuous ropes or cables from other material than wires.

My present invention is an improvement upon a machine of similar character invented by me and patented to me in and by United States Letters Patent No. 358,663, dated March 1, 1887, to which reference is to be made.

The object of my present invention is to simplify the mechanical construction of a machine of the same general character, possessing the same capacities, and embodying the same general mode of operation as my former patented machine,—my special object being to relieve the basal spider of all unnecessary weight in order to reduce friction, to simplify the gearing, strengthen and solidify, while simplifying, the frame-work, and by compacting it into the smallest possible cylindriform compass adapt the machine as an entirety to be run at a higher speed than has heretofore been possible in machines of the class in question.

Machinery embodying a good form of my present improvement is represented in the accompanying drawings and described in this specification, the particular subject matter claimed as novel being hereinafter definitely specified.

In the drawings.

Similar letters of reference indicate corresponding parts.

Referring now to the first thirteen figures of the drawings, A represents a main step or hub which is fixedly erected from a bed plate or upon the ground. Upon this main step is concentrically mounted for revolution a horizontally disposed combined carrying and driving spider, B, with which is fixedly connected for rotation a hollow or tubular vertically erected main shaft C.

$a$ is an aperture or passage through the main step, which communicates with the hollow interior of the main shaft. Through this aperture the main core $c^x$ is led to within the hollow interior of the main shaft.

The carrying and driving spider B is a radially-armed or wheel-like contrivance formed or provided with a peripheral beveled rack $b$, and with a peripheral carrying rim $b^x$ which rests upon a series of circumferentially disposed carrying rolls D mounted upon fixed pillow blocks $d$. As in the case of my former machine, this carrying and driving spider rests upon and revolves with respect to both the main step and the carrying rolls.

E is a beveled driving pinion, the teeth of which engage with the teeth of the rack of the carrying and driving spider, which, being driven by any suitable power and at any desired speed, serves to impart rotation to said carrying driving spider.

F is a fixed horizontally-disposed annular driving rack, suitably supported, conveniently upon the standards $f$, in concentricity with the main step.

G is a fixed major eccentric step, horizontally disposed, and conveniently connected with the driving rack and supported through the medium of its standards $f$ eccentrically with respect to the main step and said driving rack.

Free for rotary movement upon and with respect to the eccentric step, is what I term a major directing disk H, which is provided with a series of circumferentially equidistant peripheral tubular bearings $h$ in which are entered, free for rotary movement, the depending wrist pins $i$ of major links I, the fixed upwardly extending link shafts or spindles $i^x$ of which pass completely through tubular bearings $b^2$ formed in the arms of the carrying and driving spider, and, at a point above said arms, are fixedly provided each with a yoke or frame J which constitutes the carrier of one of the strand-core bobbins K.

From the foregoing description and relationship of parts it will be apparent that the aggregate weight of all of the strand core bobbins and their carriers is alone superimposed upon and borne by the carrying and driving spider, and near to its circumferential rim which is supported upon the carrying rolls, and that therefore all of the strand core bobbins occupy a common level near the base of the machine; and also apparent that the weight of all of the strand formers is taken off the said spider.

In the mounting of the machine all of the major connecting links I present or trend in the same direction,—that is to say, vertical planes bisecting their respective longitudinal axes, are parallel. When, therefore, motion is, through the driving pinion, peripherally applied to the carrying and driving spider to occasion its revolution and that of the main shaft with respect to the main step, and also the revolution of the strand core bobbins with respect to the main shaft,—the connection of the said spider with the major directing disk, which floats so to speak free for revolution upon the eccentric step, occasions through the connecting major links a preservation of the parallelism or directional relationship of the said links throughout the revolution of the carrying and driving spider. Inasmuch, moreover, as the carriers J of the strand core bobbins are fixedly connected with the upper extremities of the link shafts $i^x$, which latter, as stated, are fixedly connected with or a part of the major links, it is obvious that the said carriers will all continue to trend in whatever initial position they happen to be set, and consequently maintain a given and preferably parallel disposition throughout the revolution of the carrying and driving spider. As, therefore, the strand core bobbins which are carried by said carriers must of necessity maintain the position of their respective carriers, it is obvious that the several strand core bobbins will all maintain their initial trend throughout the revolution of the said spider. This maintained disposition of the strand core bobbins therefore insures against torsion in the strand cores $k$ which are wound upon said bobbins.

It will now be understood in what manner the carrying and driving spider and the main shaft are together revolved, and also in what manner the strand core bobbins which are disposed upon and alone carried by the arms of said spider are likewise revolved.

Figure 14:
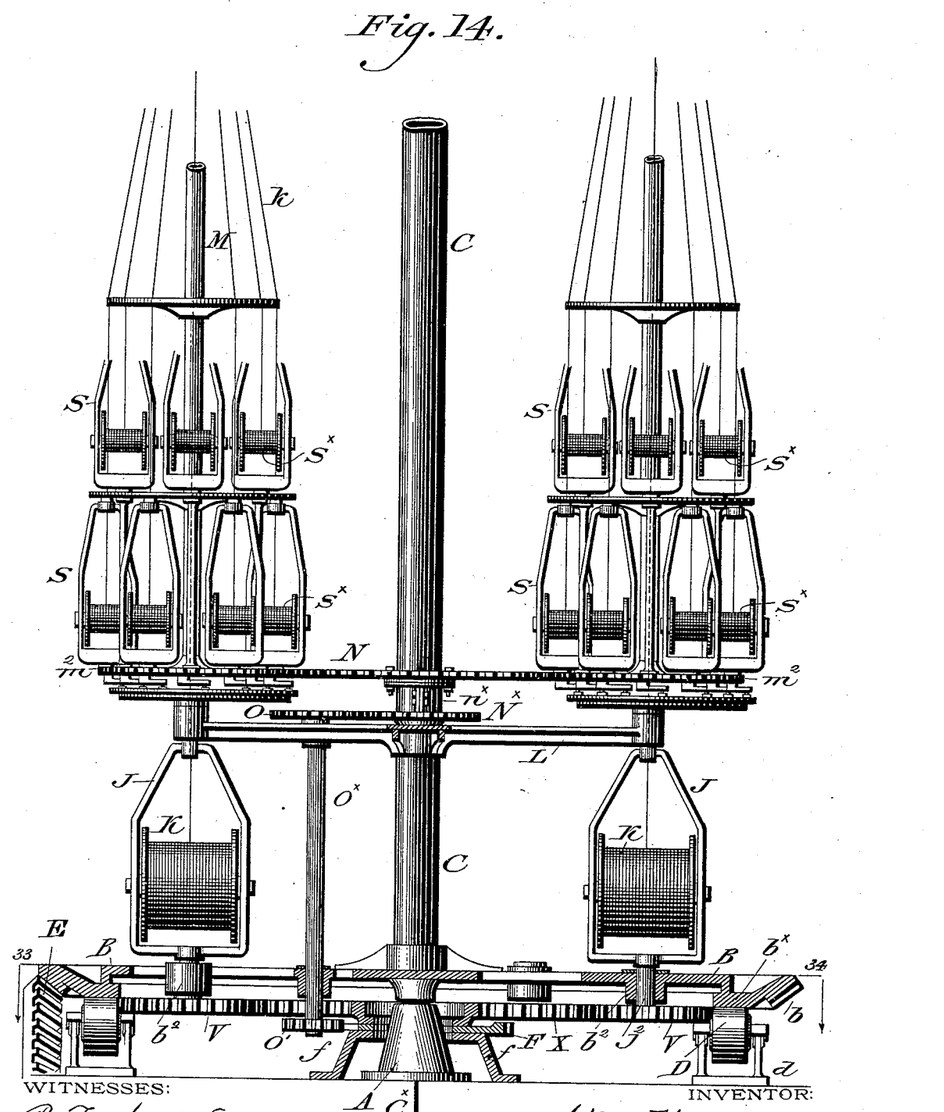
Fig. 14 is a fragmentary, enlarged elevational view, similar to Fig. 1, of a portion of the machine represented in Fig. 1 from the base up to the region of the upper flier spiders of the strand formers, and of a modified form of the devices to which I resort for preserving in the carriers for the strand core bobbins a given directional relationship throughout their revolution,—section being supposed through the carrying and the driving spider, the idler rack, and the driving rack in the plane of the dotted line 31–32 of Fig. 15, and the carrier pinions, and idler pinions exposed by the plane of section, as well as the counter shaft, and master pinion, being shown in side elevation.
Figure 15:
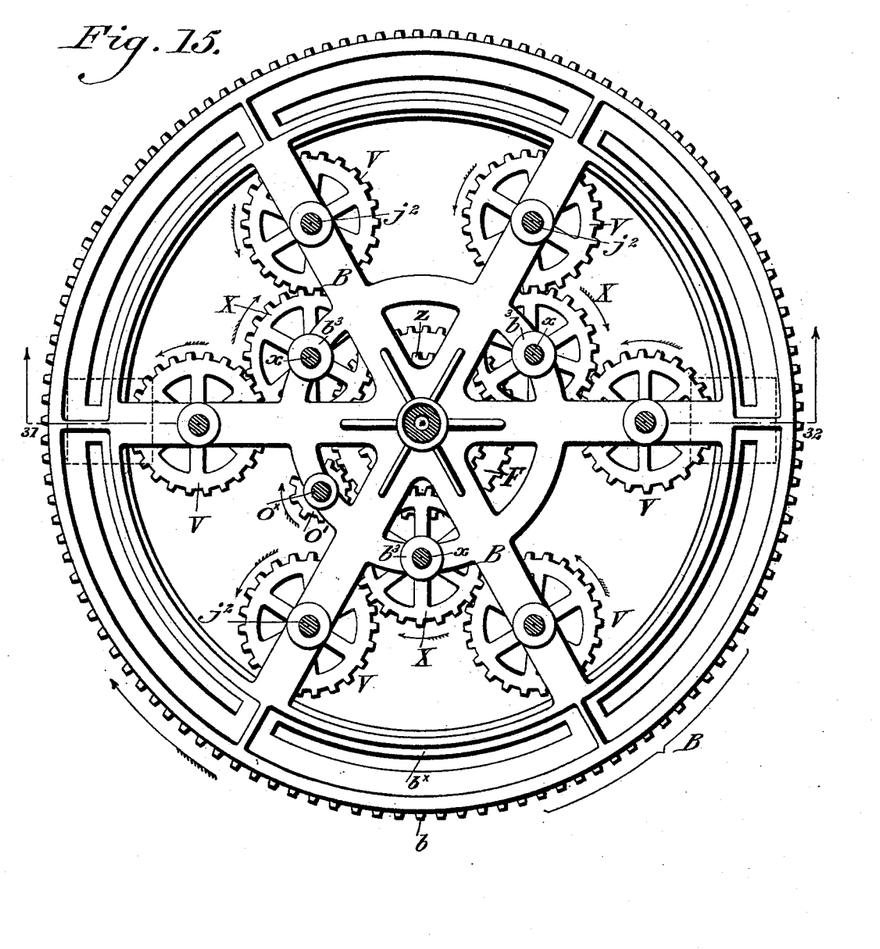
Fig. 15 is a plan of the base of the machine represented in Fig. 14, section being supposed in the plane of the dotted line 33–34 of said figure and sight being taken in the direction of the arrows upon said line.

It is proper here to state that the devices above described as constituting a means for preserving in the carriers for the strand core bobbins a given directional relationship throughout their revolution, are such as I prefer to employ, but that they are not the only means to which resort may be had for effecting the said result, and that in Figs. 14 and 15 I have represented a modified form of devices for preserving in said carriers the aforesaid relationship, which devices are hereinafter described.

Fixedly connected with and rotated by the main shaft are a pair of, in the form of machine represented, six-armed horizontally disposed spiders, which I term the minor spiders, and of which I designate the lower L and the upper $L^\times$, the said letters for simplicity being respectively applied to the several arms which, in fact, compose the respective spiders. The arms of the respective minor spiders are of equal radial projection, and respectively disposed by fellow or companion arms in the same vertical radial planes.

Interposed between the upper and lower minor spiders, and wholly supported by and between companion arms thereof, are six strand formers, each carrying an assemblage of strand wire bobbins each of a similar construction and mode of operation hereinafter set forth.

It is to be understood that, although this description is directed to the specified machine represented in the drawings, which happens to be a machine having six strand formers and therefore one capable of producing six strands, yet that it is possible to organize a machine similar in general construction to and operating upon the same principle as this machine, which shall be provided with a greater or a less number of strand formers than six.

Inasmuch as both of the minor spiders are fixedly connected with the main shaft, and the main shaft fixedly connected with the carrying and driving spider, the revolution imparted to the latter in the manner hereinbefore explained will occasion the revolution of all of the strand formers in respect to the main shaft,—the said revolution being that necessary to bring to pass the laying or twisting of the strands, formed as hereinafter explained in the respective strand formers, about the main core which is led up through the main shaft.

It being a desideratum in machines of this class to employ as many as twelve strand wire bobbins in each strand former, and also a desideratum to compact the strand formers themselves within the smallest possible cylindric compass so that they can be both brought as near as possible to the main shaft, and also be rapidly revolved with a minimum expenditure of power,—I have resorted to a construction in which the strand formers contain two series or levels of strand wire bobbins, which respectively as to the respective series alternate with each other, and have thereby overcome the large cylindriform compass of the strand formers of my patented machine in which twelve of the flier frames of each strand former occupy a common level.

As all of the strand formers are of the same construction,—a description of one will suffice for all.

The strand formers represented are each provided with twelve strand wire bobbins $S^\times$, so as to be adapted to lay as many as twelve strand wires $k'$ about a strand core $k$ to form a strand $k^\times$. Each strand former is composed, essentially, of a rotatable housing or framework for sustaining the strand wire bobbins. I prefer to arrange the strand wire bobbins in two tiers, the one above the other, and therefore resort to the following construction, and reference is now, as stated, made to but one strand former:—

M is a hollow strand former shaft, supported at its base in a manner hereinafter set forth by an arm of the lower minor spider L, and supported at or near its upper extremity by the companion arm of the upper minor spider $L^\times$. Fixedly connected with this shaft are three parallel horizontally disposed and preferably vertically equi-distant flier spiders, of which I designate the uppermost $m$, the middle $m'$, and the lowermost $m^2$. These flier spiders are preferably radially-armed or wheel-like contrivances having peripheral rims, but the rims may be dispensed with and the devices made as plates or disks, lightened, if desired, by perforations.

The lower flier spider $m^2$ is provided with a peripheral toothed rack $m^\times$ which is in engagement with a major spur wheel N, Figs. 1, 3, 4, 5, and 8, concentric with the main shaft and freely rotatable thereon, which is joined to, or formed or connected with a minor spur wheel $N^\times$ disposed in parallelism with, but in a plane below, said major spur wheel.

Both the major and the minor spur wheels are preferably made in two sections, in order to be more readily detachable from or applicable to the main shaft with respect to which as a journal or gudgeon they both together have motion; and the minor spur wheel is conveniently provided with a flanged hub $n^\times$, which serves as a sleeve surrounding the main shaft, and through the medium of which, by bolts $n$, the aforesaid two spur wheels are fixedly connected.

The minor spur wheel conveniently rests upon the lower minor spider as a step.

O is a counter spur wheel engaged with the minor spur wheel $N^\times$, and fixed upon the upper extremity of a vertical counter shaft $O^\times$, parallel with the main shaft, journaled at its upper extremity in the lower minor spider L and at its lower extremity in the carrying and driving spider B, and extending downwardly through the latter, and as to its projecting lower extremity equipped with a fixed master pinion $O'$ set to engage with the fixed driving rack F, so as to be rotated thereby as the machine as an entirety revolves. It will now be apparent that the master pinion $O'$, being in the revolution of the carrying and driving spider in continuous contact with the fixed driving rack, will receive from said rack a rotary movement which, through the counter shaft, the counter spur wheel, the minor spur wheel, and the major spur wheel, it will communicate to the toothed lower flier spider $m^2$, (that is to say to the peripheral rack applied to said spider), of each strand former,—all of the said lower flier spiders being in similar engagement with said major spur wheel,—a rotary movement such as to occasion the rotation of each strand former about its own axis, as all of said strand formers revolve about the main shaft as a common axis.

The speed of rotation of each strand former relative to the speed of the machine as an entirety, that is to say the number of turns which each strand former makes upon its own axis during one complete turn or revolution of said strand former about the main shaft, is determined by the relative diameters of the peripheral racks $m^\times$, the major and minor spur wheels, the counter spur wheel, the master pinion, and the driving rack, and is a matter within the domain of the constructor of the machine. Changes of speed are conveniently effected by changing only the counter spur wheel O and the minor spur wheel $N^\times$.

In practice, I prefer so to proportion the diameters and the respective numbers of teeth of the said several aforesaid toothed devices in such manner that each strand former makes about three revolutions upon its own axis to its each revolution about the axis of the main shaft.

Each of the carriers J of the strand core bobbins is provided at its upper extremity, in axial alignment with its link shaft $i^\times$, with a tubular gudgeon $j$, which passes through a tubular bearing $l$ in an arm of the lower minor spider L, which is rigidly connected with a hub $p$ stepped upon the said bearing $l$ as a carrying base or step, and which is formed or equipped with a horizontally disposed minor eccentric step P,—or one eccentric with respect to the tubular gudgeon of the carrier and the shaft of that strand former in connection with which it happens to be disposed,—and the said minor eccentric step is equipped with an annular ring, which I term a minor directing disk Q, which floats, rides or rotates upon it.

Into tubular bearings $q$ in the aforesaid minor directing disk are entered for rotary movement the depending wrist pins $r$ of minor links R having upwardly extending shafts or spindles, which I term flier shafts $r^\times$, which pass through tubular bearings $m^3$ formed in the lower flier spider $m^2$, and extend through, and above the upper level of, said spider are equipped with the flier frames S of the strand wire bobbins $S^\times$, as hereinafter set forth.

It having been explained that the carriers of the strand core bobbins maintain a given trend and directional relationship throughout their revolution about the main shaft, it will be readily understood that the minor eccentric steps, which, as stated, are connected with said carriers, are maintained in a similar given trend and directional relationship throughout their revolution about the main shaft, and that, therefore, through the operation of their minor directing disks, said steps serve to maintain, throughout the revolution upon their own axes of the strand formers, a given trend or directional relationship in all of the minor links, and consequently in all of the flier frames of the strand wire bobbins with which said links are, as stated, through their flier shafts, connected, and with which said strand formers are provided.

S are the flier frames of the strand formers, being yokes or carriers for the strand wire bobbins $S^\times$, similar in general character to the carriers for the strand core bobbins K. Six of these flier frames are erected between the lower and the middle flier spiders. $m^2$ and $m'$, and six between the middle and the upper flier spiders, $m'$ and $m$.

Each of the flier frames of the upper six frames which compose the upper tier being disposed between two neighboring flier frames of the lower six frames which compose the lower tier,—the arrangement, as is apparent from the drawings, is such that the frames of the respective tiers or series are, by series, respectively alternated or staggered. Such of the flier shafts $r^\times$ of the minor links R as are connected with the flier frames of the lower tier, are short shafts of length simply sufficient to pass through the lower flier spider $m^2$ and connect with said lower frames; while such of the said flier shafts $r^\times$ as are connected with the flier frames of the upper tier, are of length sufficient to extend upward from above the lower flier spider $m^2$ through the middle flier spider $m'$, and to be, above said middle spider, connected with said upper frames.

The foregoing arrangement enables me to employ a larger number of strand wire bobbins in a strand former having itself as an entirety a given small diameter, than would be possible were all twelve flier frames arranged upon a common level; and also enables me to lessen the diameter not only of each strand former but also of the machine as an entirety and therefore to impart to the latter a higher speed of revolution than would be otherwise possible.

The preservation of the directional relationship of the flier frames and strand wire bobbins, so secured, as aforesaid, during the revolution of the strand formers about the main shaft,—is essential in order to avoid torsion in the strand wires in the laying or twisting of said strand wires about the strand cores, effectuated by the revolution of the said strand formers about their respective axes.

It is, of course, obvious that it is inconsequential in what trend the flier frames and their contained strand wire bobbins, and the carriers and their contained strand core bobbins, are originally set, and, although it is preferable that the aforesaid flier frames and carriers should be set in parallel planes, it is not necessary, as the construction and operation of the devices for securing the preservation of directional relationship is always the same whatever be the position in which the said frames or carriers happen to be originally set.

The flier frames of both tiers of each and of all of the strand formers are of the same construction, and the strand wire bobbins and the strand core bobbins are all preferably so applied to their respective frames or carriers as to be readily removable.

Figure 1:
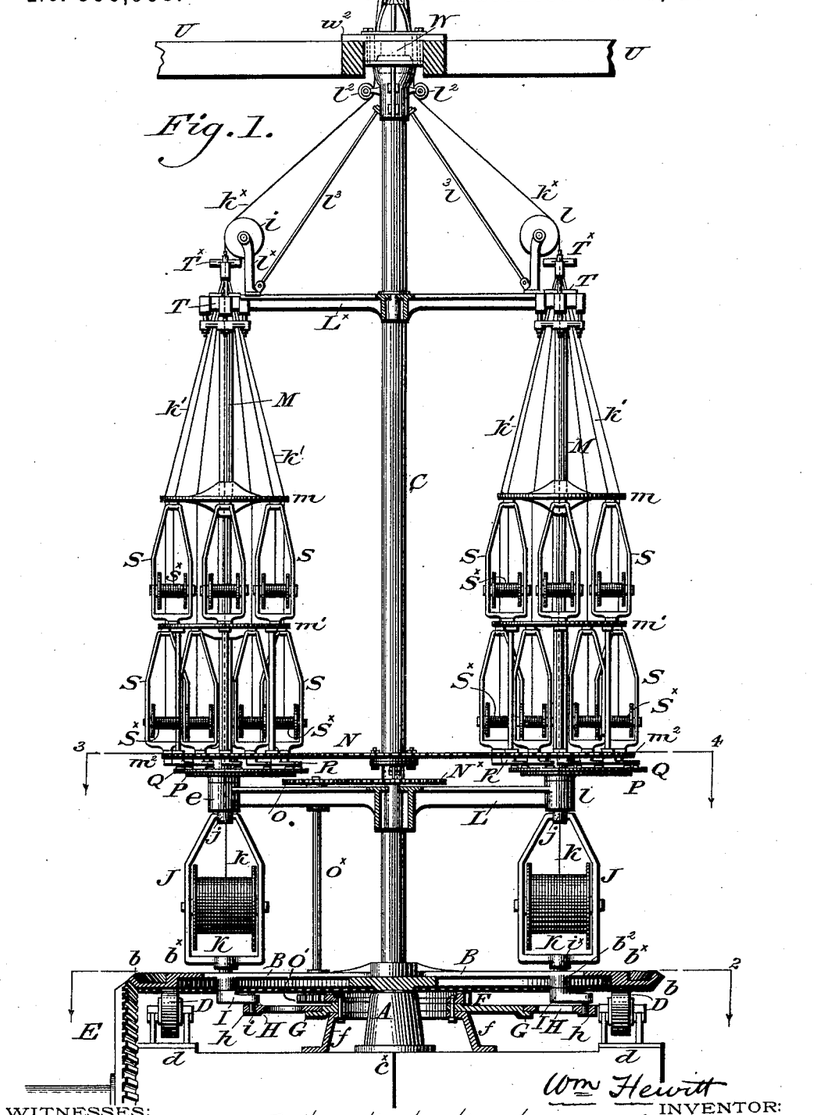
Figure 1 is an elevational view of the entire machine;—from the base up to the lower minor spider, sectional in the plane of the line 5–6 of Fig. 2; and, above the lower minor spider, sectional in the plane of the dotted line 7–8 of Fig. 3. For clearness, but two of the six strand formers which the machine represented possesses, are shown in this figure, the two front strand formers being removed by the section, and the two rear strand formers being omitted.
Figure 2:
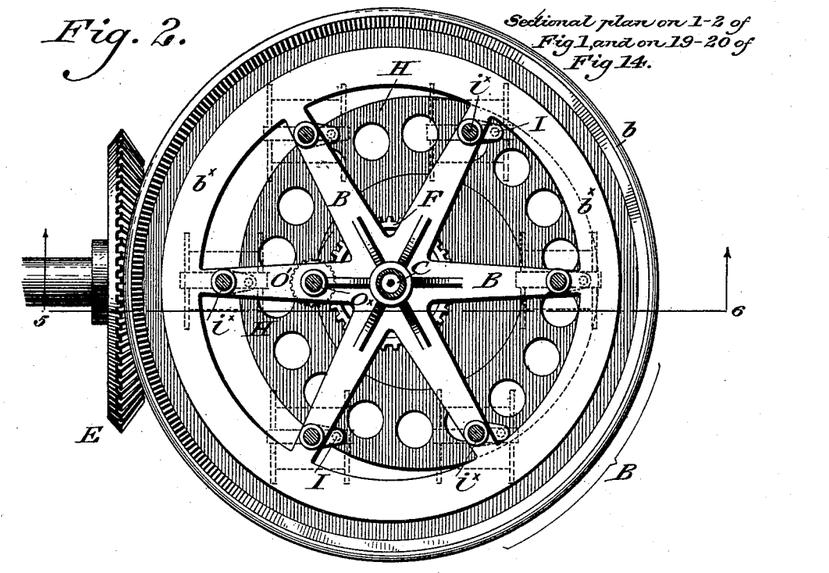
Fig. 2 is a sectional plan of a machine, in the plane of the dotted line 1–2 of Fig. 1, and also in the plane of the dotted line 19–20 of Fig. 4.
Figure 3:
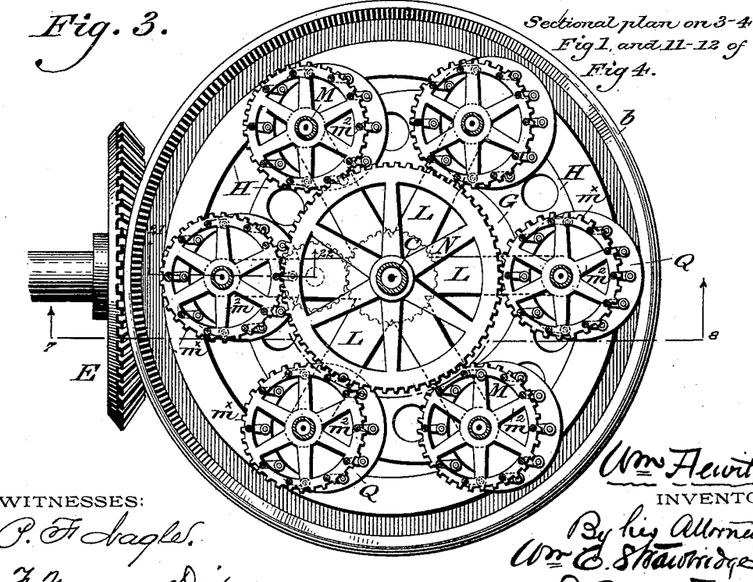
Fig. 3 is a sectional plan of the machine, in the plane of the dotted line 3–4 of Fig. 1, and in the plane of the dotted line 11–12 of Fig. 4.
Figures 4, 5, 6:
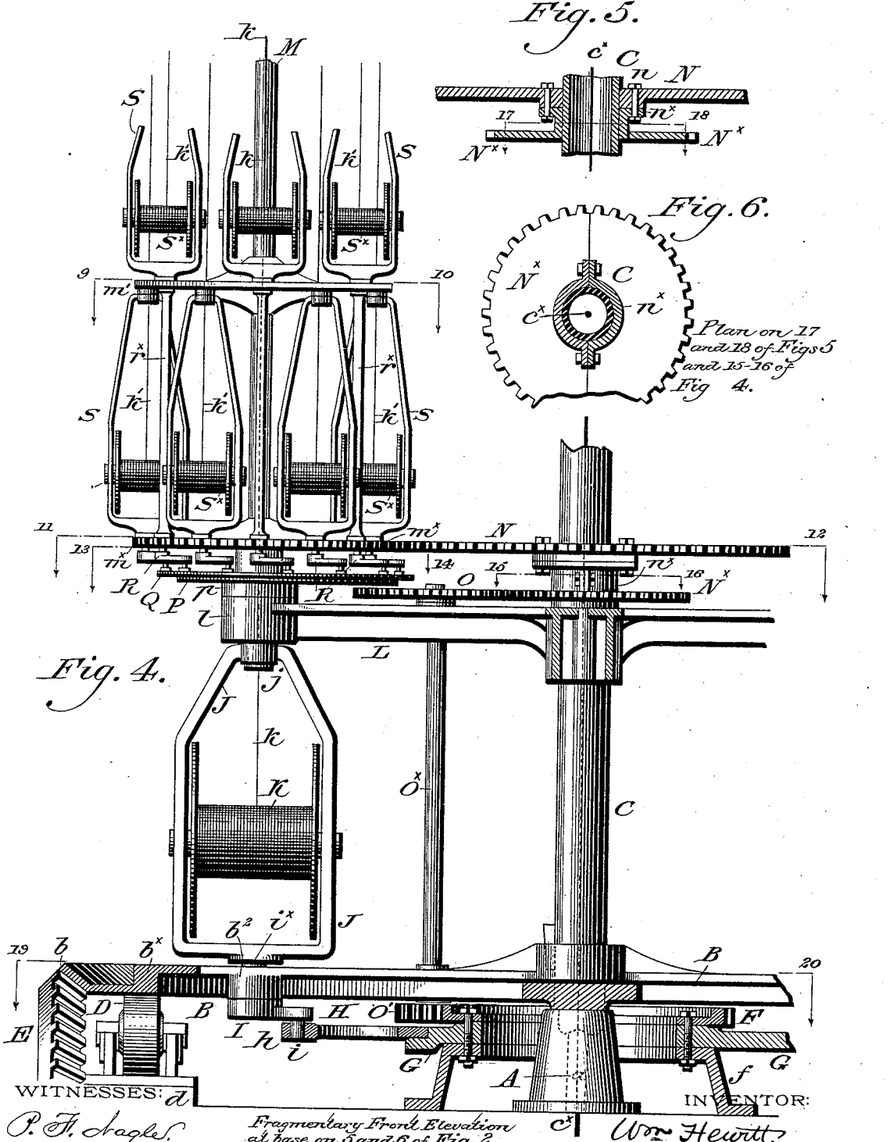
Fig. 4 is a fragmentary enlarged elevational view similar to Fig. 1, of a portion of the machine;— from the base up to the region of the lower minor spider, section being supposed in the plane of the dotted line 5–6 of Fig. 2, and the upper portion being sectional in the plane of the dotted line 7–8 of Fig. 3.
Fig. 5 is a central, vertical, fragmentary, sectional elevation through a portion of the main shaft and through the major and minor spur wheels.
Fig. 6 is a sectional plan of the minor spur wheel, in the plane of the dotted line 17–18 of Fig. 5.
Figure 7:
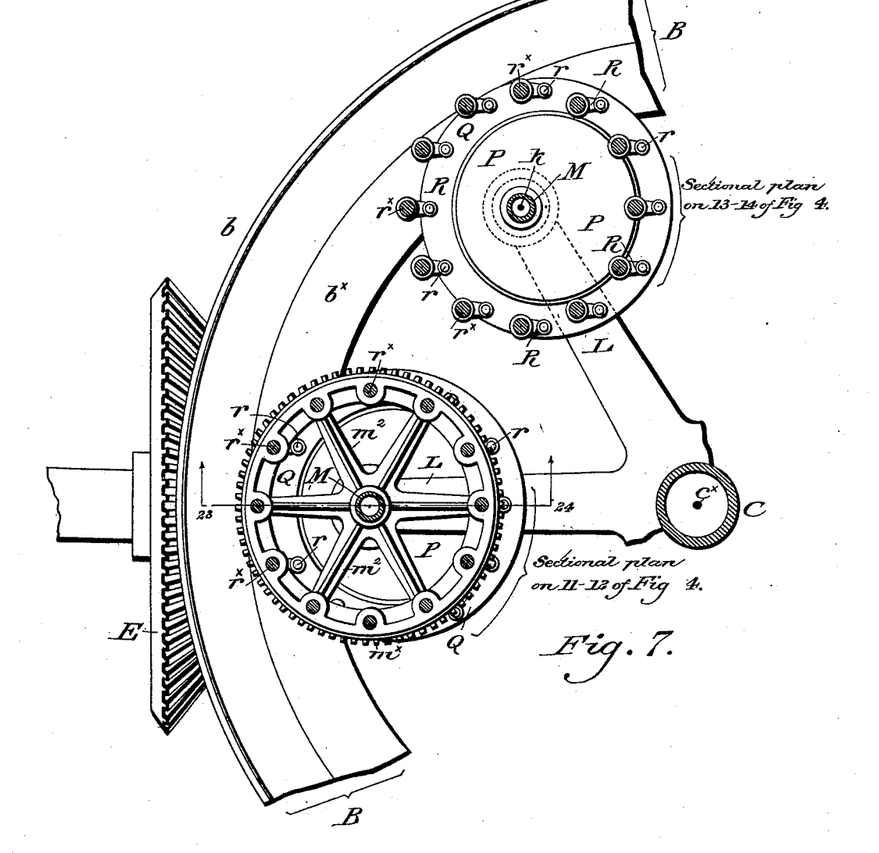
Fig. 7 is a fragmentary sectional plan, diagrammatic in character, of the basal portions of two of the strand formers, the upper one being sectional in the plane of the dotted line 13–14 of Fig. 4, and the lower one being sectional in the plane of the dotted line 11–12 of said Fig. 4.
Figures 8, 9, 10, 11, 12, 13:
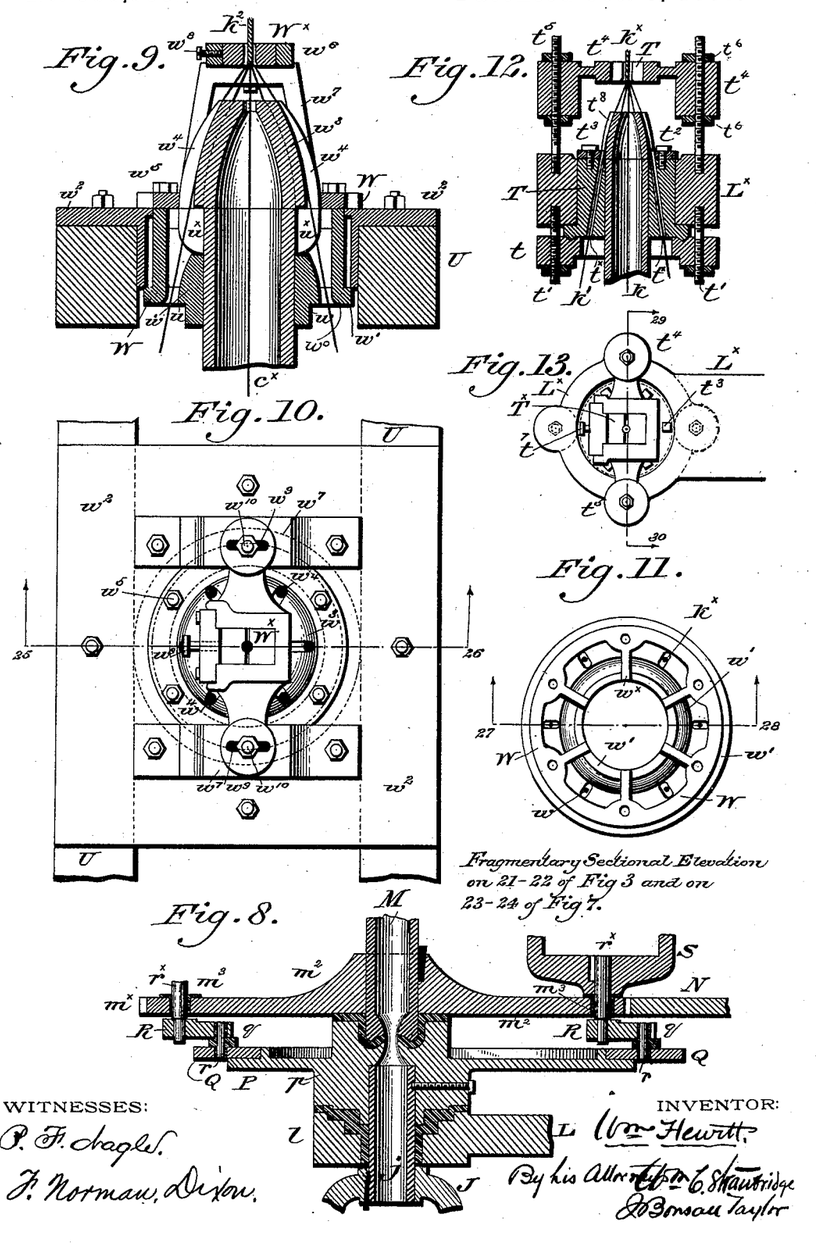
Fig. 8 is a central, vertical, fragmentary, sectional elevation through the basal portion of one of the strand formers, through an arm of the lower minor spider, and through the tubular gudgeon of one of the carriers for a strand core bobbin,—the section being in the plane of the dotted line 21–22 of Fig. 3, and the dotted line 23–24 of Fig. 7.
Fig. 9 is a central, vertical, sectional elevation through the annular rope head and associated parts of the machine, in the plane of the dotted line 25–26 of Fig. 10, and the plane of the dotted line 27–28 of Fig. 11.
Fig. 10 is a top plan view of the said annular rope head and associated parts represented in Fig. 9.
Fig. 11 is a top plan view of the annular rope head of Figs. 9 and 10, detached.
Fig. 12 is a transverse vertical elevation of one of the strand heads and associated parts, in the plane of the dotted line 29–30 of Fig. 13.
Fig. 13 is a top plan view of the strand head and associated parts represented in Fig. 12.

Each of the strand formers may be provided with a strand laying head of any usual construction, but preferably is provided with a head of a construction represented in Figs. 12 and 13, in which T is a solid cast-iron strand head vertically apertured to serve as a boxing or bushing for the upper extremity of the strand former shaft M, fitted within a recess in the extremity of one of the arms composing the upper minor spider $L^x$, and secured thereto by annular base ring $t$, itself secured to said spider arm by bolts $t'$. This strand head T contains, in the form of apparatus represented, twelve inclined or converging holes $t^x$, through which the strand wires pass, and is surmounted by an axially-apertured curved conical cap $t^2$ having twelve external vertical grooves $t^3$ aligned with the holes $t^x$ in the head, within which grooves the strand wires lie in their passage to the die. This cap is conveniently secured to the head by cap bolts $t^3$.

$t^4$ is a die holder, conveniently in the form of a yoke, supported above the cap $t^2$ upon threaded stems $t^5$ erected from the spider arm and armed with nuts $t^6$ both above and below said holder, by which the vertical set of the latter can be adjusted. This die holder $t^4$ is formed to contain a two-part or sectional cast steel die, $T^x$, within the matrix of which the strand wires $k'$ are laid upon the strand core $k$ which passes up through the strand former shaft and its conical cap and also passes centrally through said die. The die is retained in place within its holder, and adjusted, by means of an adjusting bolt $t^7$, as shown in Fig. 13.

$l$ are directing rolls erected from the upper minor spider $L^x$, which serve to direct the strands $k^x$ to the head rolls $l^2$, which are conveniently supported from the main shaft and which direct the strands into the rope laying head.

$l^3$ are tie bars which serve to brace the upper minor spider with respect to the main shaft.

The main shaft is provided with a rope laying head of any usual construction, but preferably of that represented in Figs. 9, 10, and 11, of the drawings, in which W is an annular rope head conveniently formed as a hollow casting of substantially the form shown in Figs. 9 and 11 of the drawings, that is to say having six holes $w$ formed at equal distances apart in its bottom rim $w^0$, through which the strands $k^x$ respectively pass after being led under the head rolls $l^2$, and having also upper radial webs $w^x$, alternating with said holes, and serving to connect an annular central conical body $w'$ with the circumscribing walls which are in the drawings lettered W and which form the exterior body of the head.

The rope head W is supported in any preferred manner, conveniently, however, by connecting it with a cast iron bracket plate $w^2$, bolted or otherwise suitably connected with joists U, or other timbering of the apartment within which the machine is erected, or with a scaffolding or other frame-work.

The rope head is surmounted by a curved conical axially apertured cap $W^3$, the aperture of which is aligned with the hollow core of the main shaft, and which is externally provided with six vertical grooves $w^4$ in which the strands lie, and which are aligned with respect to the holes $w$ in the bottom web $w^0$ of said rope head. This cap is conveniently secured by cap bolts $w^5$.

$w^6$ is a die holder conveniently in the form of a yoke erected upon bolsters $w^7$ supported upon the bracket plate $w^2$. This die holder contains a sectional or two part die $W^x$ in the matrix of which the strands $k^x$ are laid upon the main core $c^x$, to form the finished rope $k^2$. This die is adjustable by an adjusting bolt $w^8$. The die holder is also conveniently adjustable with respect to the bolsters which support it by being formed with slots $w^9$, through which nut-provided adjusting bolts $w^{10}$ pass.

It is apparent that the rope head and strand heads are of essentially the same construction.

Traction is, of course, exerted upon the main core and the various strands to draw them, when laid together in a complete cable $k^2$, through the head die, the rapidity of traction measurably determining the amount of twist both in the rope and in the strands.

In Figs. 14 and 15, I have represented a modified mechanism for preserving in the carriers for the strand core bobbins a given directional relationship throughout their revolution, which may be employed as a substitute for the major eccentric step, the major directing disk, and the major links hereinbefore described, and which is of the following construction:

Z is a fixed idler rack employed as a substitute for the fixed major eccentric step, but mounted in concentricity with the carrying and driving spider, and with the driving rack F.

The major directing disk H and the major links L being dispensed with, each yoke or carrier J for the strand core bobbins is provided with a depending carrier shaft $j^2$, all of which shafts, being fixedly connected axially with their carriers, extend downward therefrom and respectively pass through the tubular bearings $b^2$ formed in the arms of the carrying and driving spider B, and are below said bearings fixedly equipped each with a toothed carrier pinion V. X are a series of idler pinions, the shafts $x$ of which are housed in boxings $b^3$ formed in the carrying and driving spider D. In the arrangement represented in which six carriers for strand core bobbins are employed, there are three of these idler pinions, and they are each of such diameter and so respectively placed as to engage with the fixed idler rack on the one hand and with two adjacent carrier pinions upon the other hand, as will be readily understood upon reference to Fig. 15.

The respective diameters of the fixed idler rack, the idler pinions, and the carrying pinions, are preferably equal It will now be understood, the more readily by a reference to the arrows applied to the driving spider, carrier pinions, and idler pinions, upon Fig. 15, that, the idler rack being a fixture, in the revolution of the carrying and driving spider all of the idler pinions carried by said spider take from said rack the same directional rotation, while the respective pairs of carrier pinions in consequence take from said idler pinions a similar directional rotation, the result of which is that all of the said carrier pinions are slowly rotated in the same direction and at a common speed, and in consequence the carriers which are connected to said carrier pinions preserved in the same directional relationship throughout the revolution of the machine.

It is also obvious that the foregoing assembled devices which together constitute a modified means for preserving in the carriers for the strand core bobbins a given directional relationship throughout their revolution, can be readily applied to each strand former as a means for preserving a similar relationship in the flier frames of said strand formers;—the said application being readily effected by removing the minor links R, the minor eccentric step P, and minor directing disk Q, of each strand former; and, in lieu thereof, by affixing to the hub $p$ an idler rack, connecting with each flier shaft $r^x$ a pinion, and applying to the under face of the lower flier spider $m^2$ intermediate idler pinions respectively engaged with the pinions so applied to the flier shafts and the idler rack so applied to the hub $p$, after the same manner that the idler pinions X are applied to and engaged with the carrier pinions V and idler rack Z in the device already described for preserving in the carriers of the strand core bobbins their directional relationship.

Having now described a good form of apparatus embodying my invention and sufficiently also the operation of the same, it will be perceived that the machine is adapted to make any of the usual kinds of rope.

The strand cores, which are made outside of the machine and wound upon the strand core bobbins which are then applied to their carriers, may be either single wires or wire or textile cords formed in stranding machines. The machine, for instance, is adapted for the production of rope with seven, twelve, or nineteen wires to the strand;—rope of seven wires to the strand being made by using plain wire in the strand core bobbins, in connection with six of the strand wire bobbins in each strand former;—rope of twelve wires to the strand, by using strand cores of three wires each previously twisted in any ordinary stranding machine in the strand core bobbins, and plain wire in nine of the strand wire bobbins of each strand former;—and rope of nineteen wires to the strand, by using strand cores composed of seven wires previously twisted, and plain wire in all of the strand wire bobbins of each strand former;—and what is known as pliable "tiller rope," by using strand cores previously twisted of seven wires each, and strand wires similarly formed of seven wires each in six of the strand wire bobbins of each strand former. The cores of the strands may also, if desired, consist of cords.

It will be apparent that the carrying and driving spider supports only the weight of all of the strand core bobbins and their carriers, all of which are assembled in the same plane and superimposed low down in the machine upon said spider; and also that the strand formers are of small cylindriform compass, and supported, independently of said carrying and driving spider, from the shaft by the minor spiders, and all upon a common level superior to that of the strand core bobbins,—an arrangement which permits of the bringing of the entire machine within a small diametric compass, relieves the basal spider of weight, reduces friction, avoids unnecessary strains upon the various driving and directional relationship preserving devices, and permits of a very rapid revolution of the entire machine attended by greatly increased capacity for work, but calling for diminished motive power.

Having thus described my invention, I claim and desire to secure by Letters Patent of the United States:—

1. The combination, of a revoluble main shaft; a carrying and driving spider connected with said shaft near its base and revoluble with it; means for supporting the peripheral rim of said basal spider and permitting the revolution thereof; a series of carriers for strand core bobbins superimposed upon a common level upon said spider; and a series of strand formers corresponding in number with the number of strand core bobbins, and all arranged upon a common level above said strand core bobbins and supported from said main shaft; substantially as set forth.

2. The combination, of a revoluble main shaft; a carrying and driving spider revoluble with said shaft; means for imparting revolution to said spider and shaft; a series of carriers for strand core bobbins superimposed upon and revoluble with said spider; means, essentially such as set forth, for preserving in said carriers for said strand core bobbins a given directional relationship throughout their revolution about the main shaft, a series of strand formers having flier frames for strand wire bobbins, corresponding in number with the strand core bobbin carriers, and all supported from the main shaft above said bobbin carriers; and means, essentially such as set forth, connected with the said carriers for the strand core bobbins, for preserving in the carriers for the strand wire bobbins a given directional relationship throughout their revolution about the axis of the strand former of which they are members; and means, essentially such as set forth, for imparting revolution to the strand formers about their own axes, substantially as set forth.

3. The combination, of a revoluble main shaft; a basal peripherally toothed carrying and driving spider fixedly connected and revoluble with said shaft; a driving pinion engaged with the teeth of said spider and adapted to revolve said spider by its power so applied to the periphery of said spider; means for supporting the peripheral rim of said spider and permitting the revolution thereof; a series of carriers for strand core bobbins superimposed upon said spider; and a series of strand formers corresponding in number with the strand core bobbins and all supported from the main shaft above said strand core bobbins and independently of the carrying and driving spider; substantially as set forth.

4. The combination, of a revoluble main shaft; a step upon which said shaft is mounted for rotation; a carrying and driving spider concentric and revoluble with said main shaft; means, essentially such as set forth, for applying to the periphery of said spider power to revolve it; a major eccentric step eccentric with respect to the main step; a major directing disk mounted upon and revoluble with respect to said eccentric step; major links intermediate between said spider and directing disk; a series of carriers for strand core bobbins fixedly connected with said major links and superimposed upon said spider; and a series of strand formers having flier frames for strand wire bobbins, operating in connection with and corresponding in number to the carriers for the strand core bobbins, disposed upon a common level above said bobbins, and all supported from the shaft; substantially as set forth.

5. The combination, of a revoluble main shaft; a step upon which said shaft is mounted for rotation; a carrying and driving spider concentric and revoluble with said main shaft; means, essentially such as set forth, for applying to the periphery of said spider power to revolve it; a major eccentric step eccentric with respect to the main step; a major directing disk mounted upon and revoluble with respect to said major eccentric step; major links intermediate between said spider and major directing disk; a series of carriers for strand core bobbins fixedly connected with said major links and superimposed upon said spider; a series of strand formers having flier frames for strand wire bobbins, operating in connection with and corresponding in number to the carriers for the strand core bobbins, disposed upon a common level above said bobbins, and supported from the shaft; means, essentially such as set forth, for imparting revolution to the strand formers about their respective axes; minor eccentric steps fixedly connected with the carriers for the strand core bobbins; minor directing disks mounted upon and revoluble with respect to said minor steps; and minor links interposed between and operative in connection with the said directing disks and the flier frames of the strand formers; substantially as set forth.

6. The combination, of a strand former composed of two tiers of alternating or interdisposed flier frames for strand wire bobbins, one tier above the other, and the flier frames of both tiers in the same cylindric plane; shafts applied to the flier frames of the respective tiers, all occupying the same cylindric plane and terminating upon a common level below the lower tier; minor links connected with said shafts; mechanism, essentially such as set forth, for maintaining a given directional relationship in said links and consequently in the flier frames of both tiers; a carrier for a strand core bobbin, directly connected with the mechanism for preserving the directional relationship of said strand wire bobbins; means, essentially such as described, for imparting revolution to the strand former upon its own axis; and means, essentially such as set forth, for imparting revolution to the strand former and the carrier for the strand core bobbin together about a center, for supporting said carrier, and for preserving in it throughout its revolution a given directional relationship with respect to the points of the compass; substantially as set forth.

7. The combination of a revoluble vertical main shaft; a basal carrying and driving spider; means applied to the periphery of said spider for revolving it and the main shaft; means for supporting the peripheral rim of said basal spider and permitting the revolution thereof; a series of carriers for strand core bobbins superimposed upon said basal spider and all upon the same level; minor spiders applied to the shaft and revoluble with it; and a series of strand formers supported from said main shaft upon said minor spiders; all upon a common level superior to that of the strand core bobbins, and all of them supported wholly by said minor spiders; substantially as set forth.

8. The combination of a revoluble vertical main shaft; a basal carrying and driving spider; means applied to the periphery of said spider for revolving it and the main shaft; means for supporting the peripheral rim of said basal spider and permitting the revolution thereof; a series of carriers for strand core bobbins superimposed upon said basal spider and all upon the same level; minor spiders applied to the shaft and revoluble with it; a series of strand formers supported from said main shaft upon said minor spiders; all upon a common level superior to that of the strand core bobbins, and all of them supported wholly by said minor spiders; and means, essentially such as set forth, for imparting to the strand formers revolution about their own axes; substantially as set forth.

9. The combination with a rotary main shaft, of a number of strand formers disposed radially around the said shaft, means for imparting separate rotation upon their own axes to the said strand formers as they move around the axis of the said shaft in the revolution of the latter, a series of flier frames upon each of the said strand formers, an eccentric step in proximity to each strand former, a directing disk operating in connection with each eccentric step, links connected with the said flier frames and with the directing disk, and means for preserving in said eccentric steps a given directional relationship throughout their revolution with the main shaft, substantially as described.

10. The combination with a rotary main shaft, of a number of strand formers disposed radially around the said shaft, means for imparting separate rotation upon their axes to the said strand formers as they move around the axis of said shaft in the revolution of the latter, flier frames mounted upon each of the strand formers, carriers for strand core bobbins corresponding in number with the strand formers, means for preserving in said carriers a given directional relationship throughout their revolution with the main shaft, an eccentric step connected with each carrier, a directing disk operating in connection with each eccentric step, and links attached to the flier frames and connected to the directing disk, substantially as described.

In testimony whereof I have hereunto signed my name this 2d day of July, A. D. 1888.

WILLIAM HEWITT.

In presence of—
    J. BONSALL TAYLOR,
    F. NORMAN DIXON.